July 10, 1934.  A. DININ  1,966,237
STORAGE BATTERY SEPARATOR
Filed Jan. 4, 1932
Fig. 1
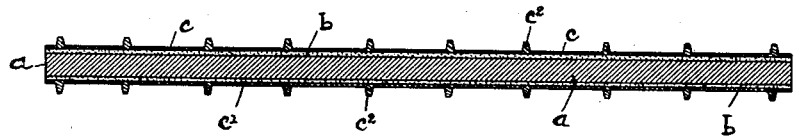
Fig. 2
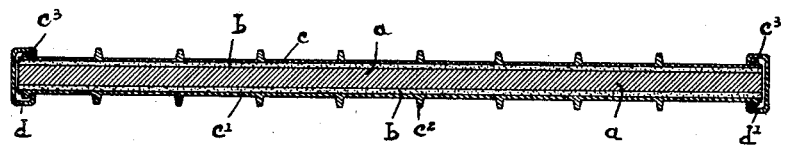
Fig. 4  Fig. 3
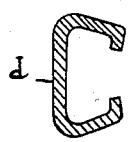 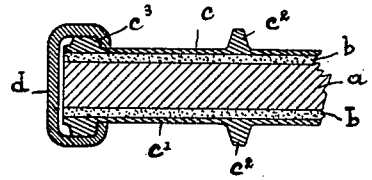
Inventor:
Alfred Dinin
By Alfred Dinin,
Atty.

Patented July 10, 1934

1,966,237

UNITED STATES PATENT OFFICE 1,966,237

STORAGE BATTERY SEPARATOR

Alfred Dinin, Nanterre, France

Application January 4, 1932, Serial No. 584,647
In France April 22, 1931

2 Claims. (Cl. 136—145)

The positive and negative plates of storage batteries are generally insulated from each other by means of perforated and ribbed separators made of ebonite, wood, or other porous material. Glasswool, or other insulating materials adapted for the purpose, may be disposed between these separators and the accumulator plates.

In the latter case however, it is difficult to ensure a convenient assemblage of the plates, the separators and the glass-wool diaphragms when manipulating and placing the bundles into the jars.

My invention has for its object to prevent this inconvenience by means of an assembling device joining into a group the plate together with the glass-wool and the separators.

This device consists substantially of a piece of electrolyte resisting material, shaped like a gutter, the elastic rims thereof bearing against the outermost ribs of the separators at their inner face, said ribs being especially adapted for this purpose. The length of this gutter corresponds to the height of the separators, while its width is such that the gutter flanks do not go beyond the outer plane of the central ribs of the separators.

An embodiment of this invention is shown by way of illustration in the accompanying drawing, in which:

Fig. 1 shows an accumulator plate together with separators and glass-wool diaphragms.

Fig. 2 is a similar plate provided with its assembling gutter.

Fig. 3 is a sectional view on an enlarged scale representing the end of a plate provided with separators fastened by means of the assembling gutter.

Fig. 4 shows on the same scale as Fig. 3 the contour of the assembling gutter before its mounting.

In the embodiment shown in Fig. 1, $a$ is an accumulator plate insulated by means of glass-wool diaphragms $b$ or the like and separators $c$, $c^1$ made of ebonite or the like and provided with ribs $c^2$.

According to the Figures 2 and 3, showing the assembling device embodying the present invention, the separators $c$ and $c^1$ as well as the diaphragms $b$ are so disposed as to be maintained against the plate $a$ by means of gutters $d$, $d^1$, consisting of ebonite, or other suitable material, these gutters fitting onto the outer ribs $c^3$ of the separators (Fig. 3). For this purpose, the height of the ribs $c^3$ is such as to correspond to the inner width of the gutters $d$, the whole being arranged in such a manner that the thickness of the inserted gutters is smaller than, or at the utmost equal to, the total thickness of the plate and its separators.

Because of this fact, there arise no difficulties in handling the plates $a$ together with their insulating materials as they are placed into the jars or are removed therefrom.

This kind of assemblage permits the utilization of a smaller thickness of glass-wool, thus ensuring a larger electrolyte volume.

Obviously, various modifications may be made, if desired, without a departure from the nature of this invention. The particulars of construction and mounting may be modified. It should be well understood that any suitable operation, material and product may be utilized for the practice of this invention.

I claim:

1. In combination, a storage battery plate, a layer of loose fibrous insulating material at each side thereof, a retaining plate for the insulating material at the outer side of each layer of said insulating material, and means to hold said plates and said layers of insulating material assembled as a unit, said means comprising a pair of strips of U-shaped cross section respectively embracing opposite marginal portions of the unitary assembly, said strips being substantially coextensive in length with said marginal portions and being open at their ends whereby they are engageable by longitudinal sliding movement thereof with said marginal portions, said strips having inwardly directed resilient flanges tending constantly to move inwardly towards each other and thus tending to move the retaining plates inwardly, whereby the layers of insulating material are maintained confined between the battery plate and the retaining plates.

2. The combination as set forth in claim 1 in which ribs are provided on the outer faces of the retaining plates and in which the flanges of the strips overlie said ribs and have their inner edge portions directed inwardly across the inner faces of the ribs.

ALFRED DININ.